United States Patent Office 3,793,322
Patented Feb. 19, 1974

3,793,322
1,4-DISUBSTITUTED PIPERAZINES
James R. Shroff, Bronx, N.Y., and Victor Bandurco, Sommerville, N.J., assignors to USV Pharmaceutical Corporation, Tuckahoe, N.Y.
No Drawing. Continuation-in-part of abandoned application Ser. No. 129,940, Mar. 31, 1972. This application Dec. 15, 1972, Ser. No. 315,488
Int. Cl. C07d 51/70
U.S. Cl. 260—268 C                                      11 Claims

ABSTRACT OF THE DISCLOSURE

Piperazine derivatives of the formula

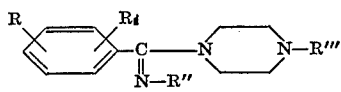

wherein R and R' are hydrogen, hydroxy, lower alkyl, lower alkoxy, halogen or trifluoromethyl, R'' is lower alkyl, lower alkenyl, cycloalkyl or phenyl and R''' is hydrogen, lower alkyl, lower alkenyl, carboalkoxy, formyl, benzyl, or cinnamyl have potent hypoglycemic activity.

---

This application is a continuation-in-part of our patent application Ser. No. 129,940, filed Mar. 31, 1972, now abandoned.

This invention relates to new organic compounds having valuable pharmacological activity and to a process for the preparation of said compounds. In particular, the invention relates to piperazine derivatives of the formula

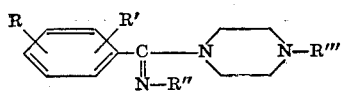

and their pharmaceutically acceptable, non-toxic acid addition salts, wherein:

R and R' are hydrogen, lower alkyl, hydroxy, lower alkoxy, halogen, or trifluoromethyl and may be the same or different;
R'' is lower alkyl, lower alkenyl, cycloalkyl, or phenyl, and
R''' is hydrogen, lower alkyl, lower alkenyl, carboalkoxy, carboalkoxyalkyl, formyl, phenyl, halophenyl, cinnamyl, benzyl or benzylhydryl.

The lower alkyl, lower alkoxy and lower alkenyl groups may be branched or straight chained and contain up to 6 carbon atoms. The cycloalkyl groups contain from 3 to 7 carbon atoms in the ring which may also carry a lower alkyl substituent.

The carboalkoxy groups contain alkyl groups having from 1 to 5 carbon atoms and include carbomethoxy, carbethoxy, carbopropoxy, carbobutoxy and the like.

Desirably, R and R' are lower alkyl, preferably methyl, or halogen, preferably chloro; R may be hydrogen and R' is then chloro, lower alkyl, preferably methyl, or trifluoromethyl; R'' is lower alkyl, preferably isobutyl, and R''' is carbethoxy.

According to the process of this invention, the piperazines were prepared by heating in an inert solvent an appropriately substituted benzimidoyl chloride of the formula

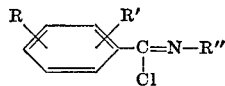

with an appropriately substituted piperazine of the formula

wherein R, R', R'' and R''' are the same as above, in the presence of an alkaline agent such as a tertiary amine, an alkali amide, an alkali alkoxide or an alkali hydride.

The benzimidoyl chlorides were prepared by first preparing a benzamide from a corresponding benzoyl chloride and an amine under the standard Schotten-Baumann procedure and then converting this amide to the benzimidoyl chloride by treatment with thionyl chloride or phosphorus pentachloride according to the procedure in Organic Syntheses, Collective vol. 4, p. 283 (1962).

The N-alkyl piperazines were prepared by reacting an alkyl halide with N-formylpiperazine in the presence of triethylamine to yield $N^1$-formyl-$N^4$-alkyl piperazine. Acid hydrolysis of this compound yielded the desired N-alkyl piperazine in accordance with the procedure in Archives Internationales Pharmacodynamie et de Therapie, vol. 128, pp. 18–19 (1960). The intermediate N-formyl piperazine was prepared by treating piperazine with formic acid to yield diformyl piperazine. The reaction of the diformyl compound with piperazine yielded the mono-formyl derivative, N-formyl-piperazine.

The intermediate N-carboalkoxy-piperazines were prepared by treating piperazine with an equivalent amount of an alkyl chlorocarbonate.

The hydrochloride salts were sometimes obtained directly. Such salts could be converted to the free bases from which the salts were prepared by treating the base in an inert solvent with the desired amount of acid to form either the mono or diacidic salt. Suitable acids for preparing such salts include hydrochloric, hydrobromic, phosphoric, sulfuric, benzoic, mandelic, cinnamic, acetic, propionic, lactic, citric, tartaric, malic, malonic, succinic, maleic, and fumaric acids.

The invention will be more fully illustrated in the examples that follow. These examples are given by way of illustration and are not to be considered as limiting.

EXAMPLE 1

$N^1$-methyl $N^4$-[3-methyl-(N-isobutyliminobenzyl)]-piperazine dihydrochloride To a solution of 5.0 g. (0.05 mol) of N-methyl piperazine and 5.1 g. (0.05 mol) of triethylamine in 100 ml. of dry benzene was added 10.4 g. (0.05 mol) of 3-methyl-N-isobutylbenzimidoyl chloride over a period of 15 minutes. The reaction mixture was then stirred at room temperature for an additional 2 hrs. After the triethylamine hydrochloride was removed by filtration, concentration of the solution afforded a yellow oily residue which was subsequently treated with dilute aqueous sodium hydroxide and then extracted with 250 ml. ether. Concentration of the dried ether layer and distillation of the residue afforded $N^1$-methyl-$N^4$-[3-methyl-(N-isobutyliminobenzyl)]-piperazine, B.P. 112–14° (0.4 mm.) in 50% yield (8.2 g.). Introduction of HCl into an ethereal solution of the base gave the corresponding dihydrochloride salt. Recrystallization from acetonitrile yield 8.9 g. (57%) of product, M.P. 234–40°.

EXAMPLE 2

$N^1$-carbethoxy-$N^4$-[3-methyl-(N-isobutyliminobenzyl)]-piperazine hydrochloride To a solution of 7.5 g. (0.05 mol) of carbethoxypiperazine in 100 ml. dry benzene was added 11.5 g. (0.05 mol) of 3-methyl-N-isobutylbenzimidoyl chloride over a period of 15 minutes. The reaction mixture was refluxed for 1 hour and then cooled. Filtration yielded 14.3 g. of the crude product. Two recrystallizations from acetone-ether afforded $N^1$ - carbethoxy-$N^4$-[3-methyl-(N-isobutyliminobenzyl)]-piperazine hydrochloride, M.P. 182-3°, in 44% yield (8.3 g.).

EXAMPLE 3

$N^1$-benzhydryl-$N^4$-(N-cyclohexyliminobenzyl)-piperazine

To a solution of 6.1 g. (0.024 mol) of N-benzhydryl piperazine in 120 ml. dry benzene was added 5.6 g. (0.024 mol) of N-cyclohexylbenzimidoyl chloride over a period of 15 minutes. The reaction mixture was then refluxed for an additional 8 hours.

Concentration of the solvent afforded a yellow oily residue which was treated with dilute sodium hydroxide and then extracted with 300 ml. chloroform. Concentration of the dried chloroform layer afforded a yellow solid. Two crystallizations of the solid from acetonitrile yielded 5.0 g. (48%) of white material, M.P. 155–56°.

EXAMPLE 4

$N^1$-(n-hexyl)-$N^4$-(N-isobutyliminobenzyl) piperazine dimaleate

To a solution of 13.6 g. (0.08 mol) of n-hexylpiperazine and 8.1 g. (11.2 ml.), (0.08 mol) of triethylamine in 120 ml. toluene, was added 15.6 g. (0.08 mol) of N-isobutylbenzimidoyl chloride over a period of 15 minutes. The reaction mixture was stirred at room temperature for a period of 2 hours. The triethylamine hydrochloride was filtered off and the filtrate concentrated under vacuum. The residual oily base was washed with 20 ml. water, extracted with 50 ml. ether and dried over anhydrous magnesium sulfate. The dry ethereal solution was then added to a solution of 18.6 g. (0.16 mol) maleic acid in 800 ml. ether to obtain the dimaleate salt. Two recrystallizations from ethanol yielded 22.5 g. (50.2%) of product, M.P. 175–6°.

In accordance with the procedures described above and set forth in the examples, the compounds in Table I below were prepared.

TABLE I

| R | R' | R'' | R''' | n | M P.° C. |
|---|---|---|---|---|---|
| H | H | i-But | Me | 2 | 190-5 |
| H | o-Me | i-But | Me | 2 | 250-2 |
| H | p-Me | i-But | Me | 2 | 243-5 |
| H | o-MeO | i-But | Me | 2 | 233-5 |
| H | p-MeO | i-But | Me | 2 | 251-3 |
| H | p-OH | i-But | Me | 1 2 | 242-4 |
| H | o-Cl | i-But | Me | 2 | 198-202 |
| H | p-Cl | i-But | Me | 2 | >300 |
| 2-Cl | 6-Cl | i-But | Me | 2 | 260-5 |
| 3-Cl | p-Cl | i-But | Me | 2 | 300 |
| H | p-F | i-But | Me | 2 | 297-9 |
| H | p-CF₃ | i-But | Me | 2 | 239-242 |
| H | p-CF₃ | i-But | Me | 2 | >300 |
| H | p-Me | i-But | Me | 2 | 243-5 |
| H | H | n-Pr | Me | 2 | 248-50 |
| H | H | Allyl | Me | 2 | 223-5 |
| H | H | Cyclohex | Me | 2 | 240-2 |
| H | o-Me | Cyclohex | Me | 2 | 252-5 |
| H | H | i-Am | Me | 2 | 235-243 |
| H | O-Me | i-Am | Me | 2 | 220-4 |
| H | H | n-Hex | Me | 2 | 250-2 |
| H | o-Me | Me | Et | 2 | 239-244 |
| H | H | n-Pr | Et | 2 | 263-5 |
| H | H | n-But | Et | 2 | 279-81 |
| H | H | Allyl | Et | 2 | 278-80 |
| H | H | i-But | Et | 2 | 270-2 |
| H | o-Me | i-But | Et | 2 | 247-49 |
| H | p-MeO | i-But | Et | 2 | 252-3 |
| H | H | Me | COOEt | 1 | 227-8 |
| H | o-Me | Me | COOEt | 1 | 214-5 |
| H | H | Et | COOEt | 1 | 237-8 |
| H | H | Allyl | COOEt | 1 | 220-1 |
| H | H | n-Pr | COOEt | 1 | 229-232 |
| H | H | n-But | COOEt | 1 | 204-6 |
| H | H | i-Am | COOEt | 1 | 143-4 |
| H | H | i-But | COOEt | 1 | 196-8 |
| H | o-Me | i-But | COOEt | 1 | 180-1 |
| H | p-Me | i-But | COOEt | 1 | 170.5-171.5 |
| 2-Me | 6-Me | i-But | COOEt | 1 | 186-8 |
| H | o-Cl | i-But | COOEt | 1 | 197-8 |
| 2-Cl | 6-Cl | i-But | COOEt | 1 | 132-3 |
| H | p-F | i-But | COOEt | 1 | 185-7 |
| 2-F | 6-F | i-But | COOEt | 1 | 162-3 |

TABLE I—Continued

| R | R' | R'' | R''' | n | M.P.° C. |
|---|---|---|---|---|---|
| H | o-CF₃ | i-But | COOEt | 1 | 171-3 |
| H | H | Cyclohex | COOEt | 1 | 222-4 |
| H | o-Me | Ph | COOEt | 1 | 222-5 |
| H | p-F | Ph | COOEt | 1 | 207-9 |
| H | o-Me | i-But | n-Hex | 2 2 | 142-3 |
| H | p-MeO | i-But | n-Hex | 2 2 | 162-3 |
| H | o-Cl | i-But | n-Hex | 2 2 | 131-2 |
| H | o-CF₃ | i-But | n-Hex | 2 2 | 99-101 |
| H | H | i-Am | n-Hex | 2 2 | 167-8 |
| H | H | n-Pr | n-Hex | 2 2 | 157-8 |
| H | H | Allyl | n-Hex | 2 2 | 144-5 |
| H | H | Cyclohex | n-Hex | 2 2 | 168-9 |
| H | H | Ph | n-Hex | 2 2 | 169-170 |
| H | H | 3,4-diMePh | n-Hex | 2 | 223-5 |
| H | H | i-But | p-Cl-C₆H₄ | 1 | 273-5 |
| H | o-Me | i-But | p-Cl-C₆H₄ | 1 | 254-6 |
| H | o-Cl | i-But | p-Cl-C₆H₄ | 1 | 218-220 |
| H | p-CF₃ | i-But | p-Cl-C₆H₄ | 1 | 253-6 |
| H | H | i-But | Ph | 2 | 218-221 |
| H | H | i-But | Benzhydryl | (³) | 150-52 |
| H | H | n-Pr | Benzhydryl | 1 | 230-32 |
| H | H | Me | Benzhydryl | 1 | 216-19 |
| H | H | Ph | Benzhydryl | (³) | 166-8 |
| H | H | i-But | Benzyl | 1 2 | 168-9 |
| H | o-Me | i-But | Benzyl | 1 2 | 168-170 |
| H | H | i-But | 2,4-di-Cl benzyl | 1 2 | 161-3 |
| H | H | i-But | 2,3,4-tri(MeO) benzyl | 2 | 226-7 |
| H | o-Me | i-But | CHO | 1 | 230-231 |
| H | m-Me | i-But | CHO | 1 | 194-6 |
| 2-Me | 6-Me | i-But | CHO | 1 | 254-6 |
| H | H | i-But | H | 2 | 225-7 |
| H | o-Me | i-But | H | 2 | 231-2 |
| 2-Me | 6-Me | i-But | H | 2 | 250-252 |
| H | o-Me | i-But | Allyl | 2 | 190-5 |

¹ Hydroiodide salt.
² Maleate salt.
³ Melting point is that of the free base.

The compounds of the present invention are potent hypoglycemic agents, producing reductions of up to 48% in the blood glucose of glucose primed rats when administered 100 mg./kg. p.o. As such, they would be useful in the treatment of diabetes. In Table II the activities of preferred compounds are shown.

TABLE II

| R | R' | R'' | R''' | Percent reduction of blood glucose |
|---|---|---|---|---|
| H | H | i-But | CO₂Et | 31.5 |
| H | o-Me | i-But | CO₂Et | 29.4 |
| H | o-Cl | i-But | CO₂Et | 43.2 |
| 2-Me | 6-Me | i-But | CO₂Et | 49 |
| H | o-CF₃ | i-But | CO₂Et | 30.5 |
| H | o-Me | i-But | Allyl | 29 |
| H | o-Me | i-But | Me | 36 |
| H | o-OMe | i-But | Me | 35.8 |
| H | H | i-Am | Me | 31.9 |
| H | o-Me | i-But | CHO | 33.7 |
| H | o-Me | i-But | Benzyl | 1 33.9 |
| 2-Cl | 6-Cl | i-But | CO₂Et | 30.8 |

¹ At 25 mg./kg. p.o.

In addition to possessing hypoglycemic activity certain compounds also possessed strong anti-arrhythmic activity which would make them useful in the treatment of auricular fibrillation and other heart conditions associated with arrhythmia. These compounds included $N^1$-$N^4$-[(N-cyclohexyl)-iminobenzyl] - piperazine, $N^1$ - carbethoxy - $N^4$ - [N-isoamyl)-iminobenzyl]-piperazine, $N^1$-p-chlorophenyl - $N^4$[(N-isobutyl)-iminobenzyl]-piperazine, $N^1$-(n-hexyl) - $N^4$ - (N-isobutyliminobenzyl)-piperazine, and $N^1$-(n-hexyl)-$N^4$-(N-3,4 - dimethylphenyliminobenzyl)-piperazine.

The compounds can be mixed with solid or liquid pharmaceutical carriers and formulated into tablets, powders or capsules, for oral administration or dissolved in suitable solvent for either oral or parenteral administration.

We claim:
1. A compound of the formula

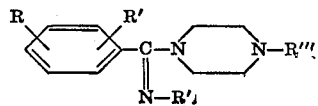

wherein:
R and R' are hydrogen, methyl, methoxy, or halogen and may be the same or different; or when R is hydrogen, R' may also be lower alkyl, lower alkoxy or trifluoromethyl;
R" is lower alkyl, allyl, cycloalkyl having from 3 to 7 carbon atoms, or phenyl; and
R''' is lower alkyl, allyl, carboalkoxy wherein the alkoxy group has from 1 to 5 carbon atoms, formyl, halophenyl, benzyl or benzhydryl;
and its pharmaceutically acceptable, non toxic acid addition salts.

2. The compound according to claim 1, wherein R is hydrogen and R' is o-methyl.

3. The compound according to claim 1, wherein R" is isobutyl.

4. The compound according to claim 1, wherein R''' is carboethoxy.

5. The compound according to claim 1, wherein
R is hydrogen,
R' is o-chloro,
R" is i-butyl, and
R''' is carboethoxy.

6. The compound according to claim 1, wherein
R is 2-methyl,
R' is 6-methyl,
R" is i-butyl, and
R''' is carboethoxy.

7. The compound according to claim 2, wherein
R" is i-butyl and
R''' is methyl.

8. The compound according to claim 2, wherein
R" is i-butyl and
R''' is benzyl.

9. The compound according to claim 2, wherein
R" is i-butyl and
R''' is formyl.

10. The compound according to claim 3 wherein
R and R' are hydrogen and
R''' is n-hexyl.

11. The compound according to claim 1 wherein
R and R' are hydrogen,
R" is 3,4-dimethylphenyl, and
R''' is n-hexyl.

References Cited
UNITED STATES PATENTS

| | | | |
|---|---|---|---|
| 3,068,236 | 12/1962 | Krapcho | 260—268 PH |
| 3,148,209 | 9/1968 | Krapcho | 260—268 PH |
| 3,406,170 | 10/1968 | Papes | 260—268 RI |
| 3,431,304 | 4/1969 | Fryer | 260—268 R |
| 3,468,882 | 7/1969 | Laskowsky | 260—268 PH |
| 3,492,331 | 1/1970 | Saig | 260—268 R |
| 3,646,029 | 2/1972 | Mullins | 260—268 R |

DONALD G. DAUS, Primary Examiner

U.S. Cl. X.R.

260—268 R, 268 BZ, 268 PH, 566; 424—250

Disclaimer 3,793,322.—*James R. Shroff*, Bronx, N.Y., and *Victor Bandurco*, Sommerville, N.J. 1,4-DISUBSTITUTED PIPERAZINES. Patent dated Feb. 19, 1974. Disclaimer filed Mar. 14, 1975, by the assignee, *USV Pharmaceutical Corporation*.

Hereby enters this disclaimer to claims 1-9, inclusive, and claim 11 of said patent.

[*Official Gazette July 22, 1975.*]